United States Patent [19]
Keller

[11] Patent Number: 5,149,182
[45] Date of Patent: Sep. 22, 1992

[54] OPTICAL FILTER FOR AN OPTICAL MEASUREMENT INSTRUMENT

[75] Inventor: Peter A. Keller, Aloha, Oreg.

[73] Assignee: Tektronix, Inc., Wilsonville, Oreg.

[21] Appl. No.: 694,603

[22] Filed: May 2, 1991

[51] Int. Cl.$^5$ .................. G01N 21/25; G01J 3/51
[52] U.S. Cl. .................. 356/405; 356/419; 359/890; 250/226
[58] Field of Search ........ 356/402, 414, 415, 417–419, 356/405, 41; 359/890, 723; 250/226

[56] References Cited

U.S. PATENT DOCUMENTS

| | | | |
|---|---|---|---|
| 3,812,350 | 5/1974 | Szabo et al. | 356/405 |
| 4,357,105 | 11/1982 | Loretz | 356/41 |
| 4,988,203 | 1/1991 | Vriens et al. | 356/416 |

Primary Examiner—F. L. Evans
Assistant Examiner—K. P. Hantis
Attorney, Agent, or Firm—William K. Bucher

[57] ABSTRACT

An improved optical filter for use in an optical measurement instrument has a corrective optical glass filter with a negative deviation in the range of 470 nm added to the optical filter to offset a positive deviation in the range of 470 nm in an amber or blue glass filter used in the optical filter. The improved optical filter in interposed between a photoelectric element in the optical measurement instrument and the source of electromagnetic radiation. The photoelectric device converts the electromagnetic radiation to an electrical signal which is processed and displayed. In one embodiment of the invention the optical filter has a spectral response matching that of the average human eye and in a further embodiment the optical filter has an approximate equal response over a spectral range from ultraviolet to infrared.

4 Claims, 6 Drawing Sheets

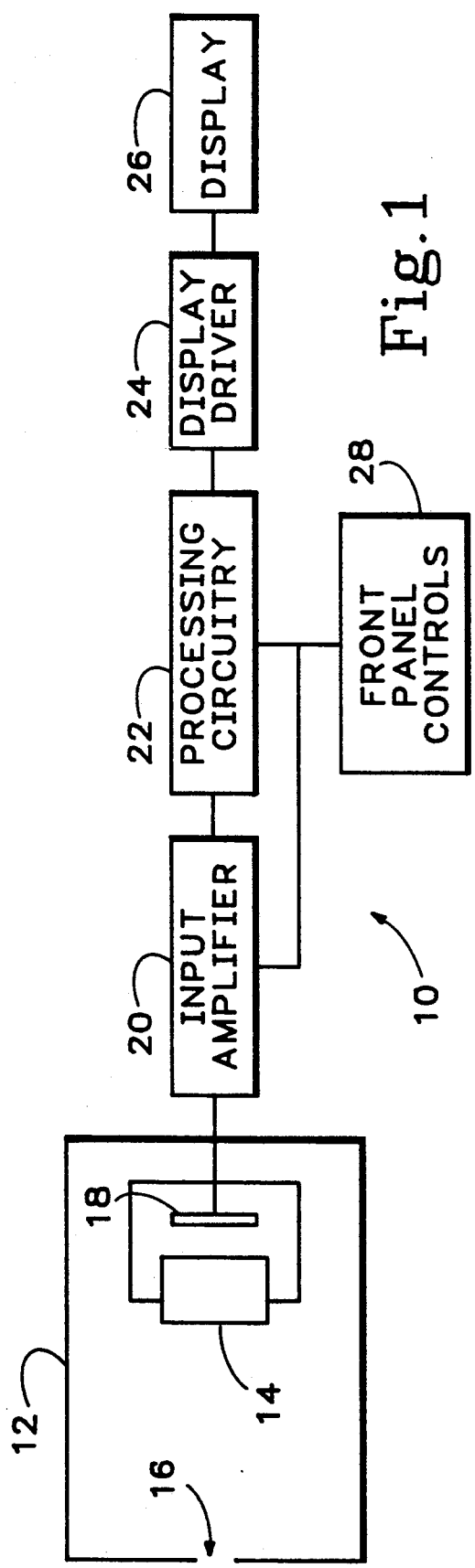
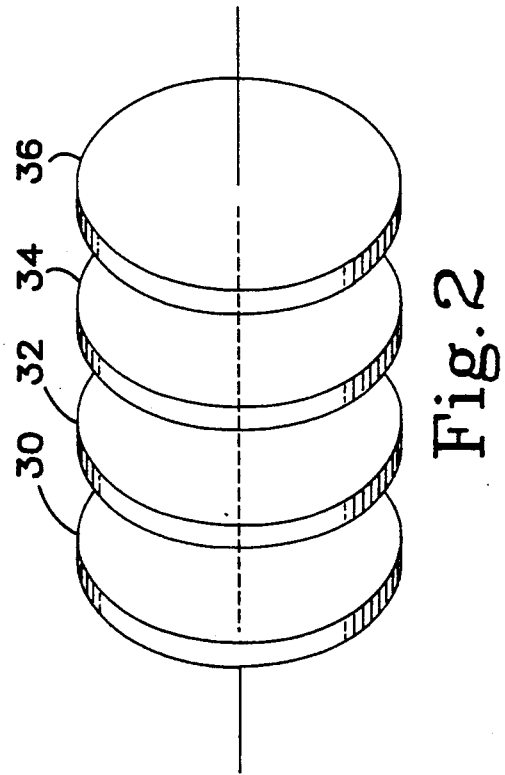

OPTICAL FILTER FOR AN OPTICAL MEASUREMENT INSTRUMENT

The present invention relates to optical measurement instruments and more particularly to an improved optical filter for such instruments that corrects for a positive deviation in the spectral response of the optical filter.

Optical measurement instruments, such as photometers, radiometers and the like, are used to measure spatial and spectral qualities of radiation in the ultraviolet to infrared portion of the electromagnetic spectrum being emitted, reflected or transmitted by an object. Most measurements of radiation in this spectral region fall into one of two categories, radiation received by a surface and radiation emitted or scattered by a surface. Photometers measure radiation in the visible light spectrum and use the human eye or its equivalent as the sensor. Radiometers measure radiation from the ultraviolet through the infrared spectrum and are designed to have a nearly equal response to as wide of range of wavelengths as possible.

Two basic designs are used in photometers, one where the human eye is the sensor and the other where a photosensitive device, such as a vacuum photocell, photoconductive cell, silicon photodiode or the like, is used. The human eye has a spectral sensitivity that responds differently to light of different colors and has a maximum sensitivity in the yellow/green region. Through experimentation, the relative radiant sensitivity of the human eye to specific wavelengths of light has been determined and a photopic curve has been defined by the Commission Internationale de L'Eclariage (CIE) and university accepted as the standard for the spectral sensitivity of the average human eye.

The photosensitive devices used in photometers have spectral responses that do not match that of the average human as defined by the CIE photopic curve. To use these devices in photometers, optical filters are placed in front of the devices to selectively absorb the wavelengths of light to correct the sensor's response to that of the average human eye. There are two basic type of optical filters for photometers, a homogeneous filter or subtractive filter and a mosaic or additive filter. The homogeneous filter is constructed out of two or more pieces of absorbing filter glasses cemented together. The pieces of glass used are uniform in transmittance across their surfaces. Radiation incident on the filter is modified by passing, in turn, through each of the spectrally selective filter glasses, which remove parts of the incident radiation spectrum by absorption. The mosaic filter is constructed using a homogeneous glass or glasses that conform somewhat to the CIE photopic curve. Smaller pieces of glass are cemented to the surface of the homogeneous glass to decrease the transmittance in specific spectral regions. By doing this, an adjustment can be made to the filter's transmittance that makes it conform more accurately to the photopic curve.

Certain type of filter glasses used in optical filters exhibit a positive deviation in the absorption of light in the range of 470 nm. This is due to impurities added to the optical filter glass. Examples of such optical filter glasses include a uranium doped amber filter glass and a cobalt doped blue filter glass. This positive deviation leads to errors in the blue portion of the light spectrum when these types of glass filters are combined with other glass filters to produce an optical filter having the CIE photopic curve characteristics.

What is needed is an optical filter that more closely matches the CIE photopic curve for the average human eye by reducing the positive deviation in certain types of glass filter in the range of 470 nm wavelength of light.

SUMMARY OF THE INVENTION

Accordingly, the present invention is an improved optical filter for use in a optical measurement instrument wherein a corrective optical glass filter exhibiting a negative deviation in the blue portion of the electromagnetic spectrum in the range of 470 nm is added to offset a positive deviation in the blue portion of the electromagnetic spectrum in the range of 470 nm of the optical filter. The optical filter has a plurality of optical glass filter elements with each element selectively absorbing a portion of the electromagnetic radiation. One of the optical glass filter elements exhibits the positive deviation in the blue portion of the spectrum in the range of 470 nm which is offset by the negative deviation in the corrective optical glass filter in the range of 470 nm. In one aspect of the present invention, the optical measurement instrument measures electromagnetic radiation as a function of the spectral response of the average human eye. The instrument has a photoelectric device for receiving the electromagnetic radiation and generating an electrical output in response to the radiant energy input. The improved optical filter having a spectral response matching that of the average human eye is interposed between the electromagnetic radiation and the photoelectric device. A means is provided for receiving the electrical output from the photoelectric device and producing an output display representative of the spectral response of the average human eye. The objects, advantages and novel features of the present invention are apparent from the following detailed description when read in conjunction with appended claims and attached drawings.

BRIEF DESCRIPTION OF THE DRAWINGS

FIG. 1 is a simplified block diagram of the optical measurement instrument according to the present invention.

FIG. 2 is an exploded view of the optical filter according to the present invention.

DETAILED DESCRIPTION OF THE PREFERRED EMBODIMENT

Figure 3:
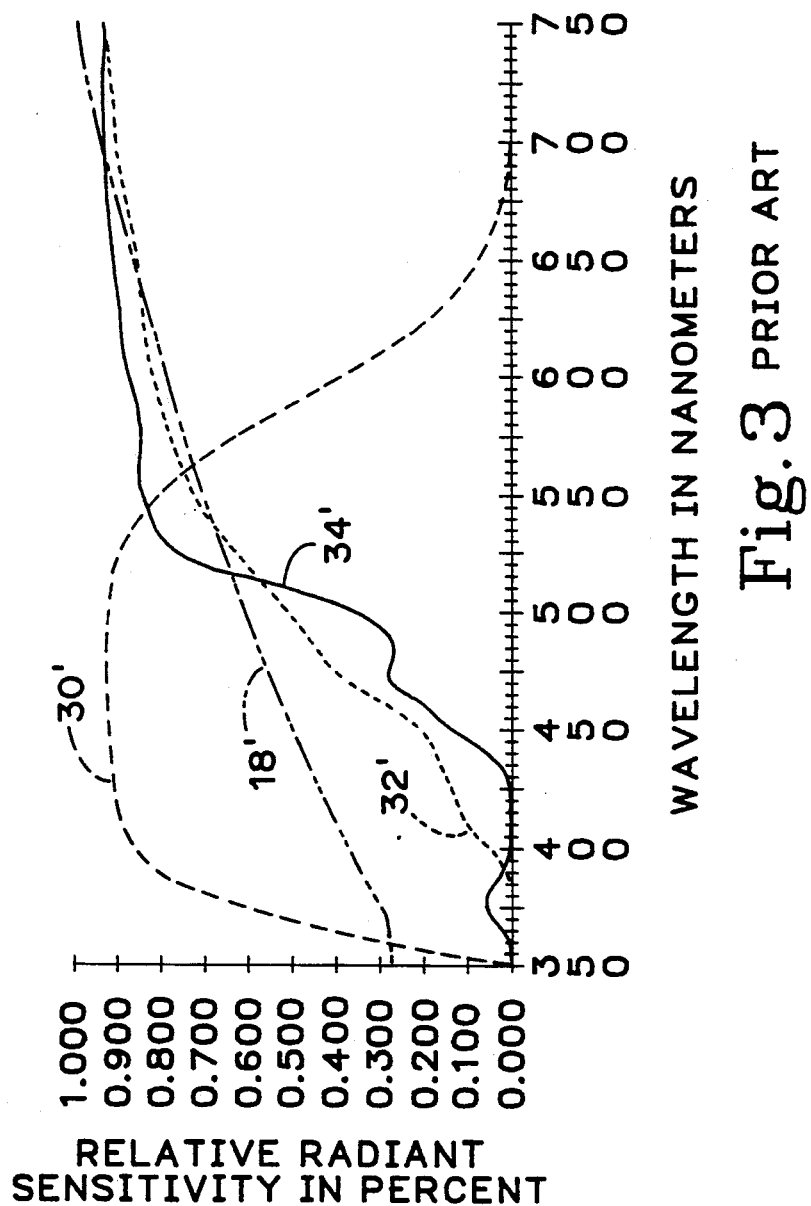
FIG. 3 is a graphical representation of the spectral response of the optical glass filter elements and sensor in a typical prior art optical sensing unit having a photoelectric device and an optical filter.

Referring to FIG. 1, there is shown a simplified block diagram of an optical measurement instrument 10, such as a photometer, radiometer or the like, for measuring electromagnetic radiation in the ultraviolet to infrared region electromagnetic spectrum. The optical measurement instrument has an optical probe 12 containing an optical sensing unit having an optical filter 14 interposed between a field defining light aperture port 16 and a photoelectric device 18, such as a photoelectric cell, silicon photodiode or the like. The light aperture port 16 may include a diffuser, optical lens or the like. The photoelectric device 18 converts the electromagnetic radiation entering through the light aperture port 16 to an electrical signal that is coupled to an input amplifier 20. The output of the amplifier 20 is coupled to processing circuitry 22 that produces an output representative of the detected electromagnetic radiation at the phototelectric device 18. The converted output of the processing circuitry 22 is coupled to a display driver 24 for driving a display 26. Operator input is provided via front panel controls 28. The optical measurement instrument 10 is equally well implemented in a digital environment by converting the analog electrical input from the photoelectric device 18 to a digital signal using an analog-to-digital converter and providing a microprocessor and associated digital circuitry well known in the digital electronics art to control the functions of the instrument.

Many type of electromagnetic radiation measurements may be made on light sources and surfaces using the optical measurement instrument 10 according to the present invention. For example, luminance and illuminance measurements may be made with an optical probe 12 that matches the spectral response of the average human eye as defined by the CIE (Commission Internationale deL'Eclariage) photopic response curve. Since photoelectric devices 18 have spectral responses much different than the human eye, an optical filter 14 is interposed between the source of electromagnetic radiation and the photoelectric device 18 for selectively absorbing portions of the electromagnetic radiation so as to match the sensitivity of the photoelectric device 18 to the spectral response of the average human eye.

The optical filter 14 is formed of multiple optical filter glass elements, referenced in FIG. 2 as numerals 30, 32, 34 and 36. The optical filter glass elements 30, 32, 34 and 36 are selected for their ability to absorb selected wavelengths of light. Such optical glass filter elements are commonly used in the optics art and are available through a number of manufactures, such as Schott Glass Technologies, Inc. of Duryea, PA or Corning Glass Class Company, Corning, NY. The optical filter glass elements 30, 32, 34 and 36 have a uniform transmittance across their surfaces and their thicknesses are adjusted to give a transmittance that closely matches the CIE photopic curve. The optical glass filter elements 30, 32, 34 and 36 are bonded together using optical cements commonly used in the optics industry, such as Norland #61 ultraviolet curing adhesive.

Figure 4:
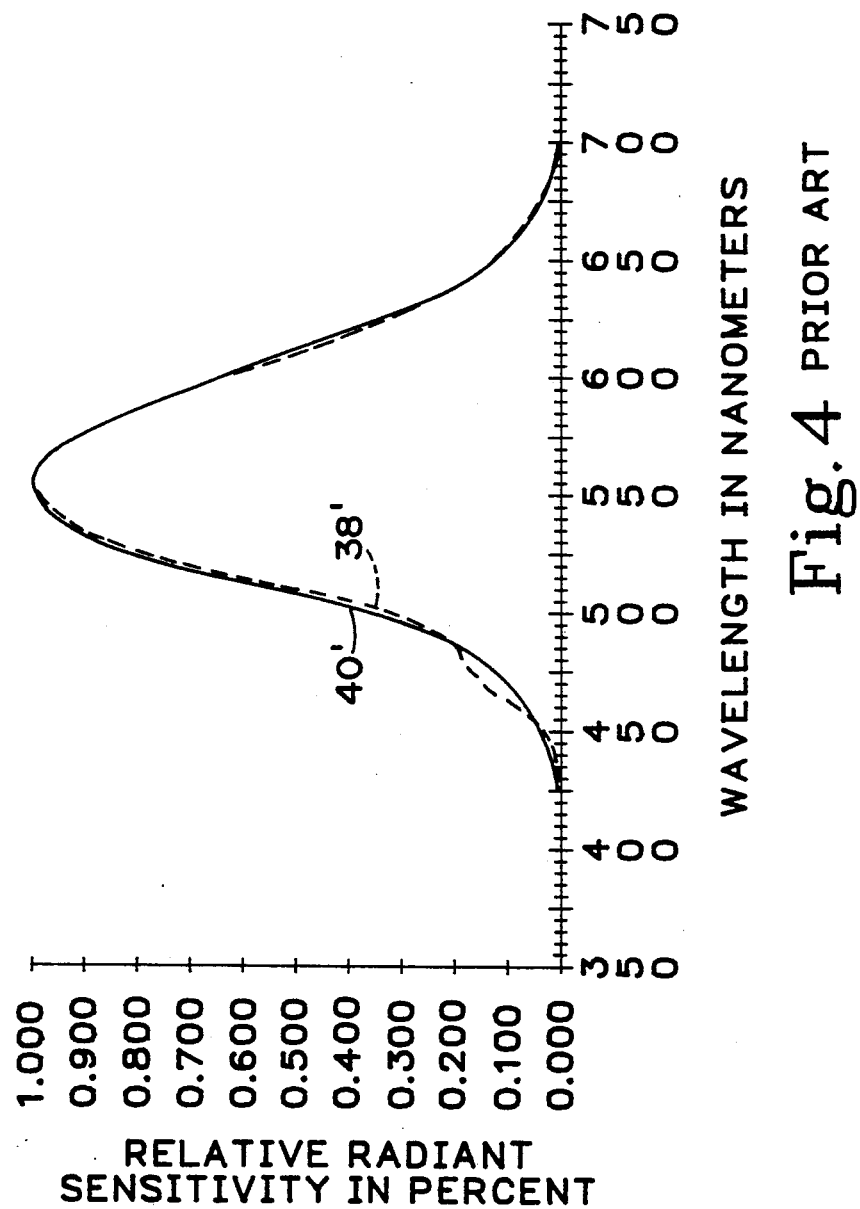
FIG. 4 is a graphical representation of the spectral response of a typical prior art optical sensing unit.

Each optical glass filter element 30, 32, 34 and 36 has a characteristic spectral response as is shown in the graphical representations of the spectral response of the optical glass filter elements in FIG. 3. The horizontal axis of the graphs are wavelengths of light in nanometers and the vertical axis is the relative radiant sensitivity in percent. The lines on the graphs correspond to the elements in the previous drawings. Line 18' is the normalized spectral response curve for the photoelectric device 18, which in the preferred embodiment is a silicon photodiode. Lines 30', 32' and 34' are the response curves for various optical filter glass elements as used in prior art optical filters. To determine the total response curve for all the combined optical glass filter elements, the relative radiant sensitivity percentage of each optical glass filter element at a particular wavelength are multiplied together. For example at a wavelength of 550 nm the approximate relative radiant sensitivity percentages for the optical filter glass elements 30, 32 and 34 are respectively 81, 72 and 83. Multiplying these numbers together give a response of 48. Continuing this process for each wavelength of light produces an optical filter having a normalized spectral response curve 38' shown in FIG. 4. As is shown in the FIG., there is a positive deviation in the blue portion of the spectrum in the range of 470 nm. This is caused by the amber or blue glass filter element as represented by line 34' in FIG. 3. Until now, this positive deviation in glass optical filters used to match the CIE photopic curve 40' representing the average human eye has not been overcome.

Figure 5:
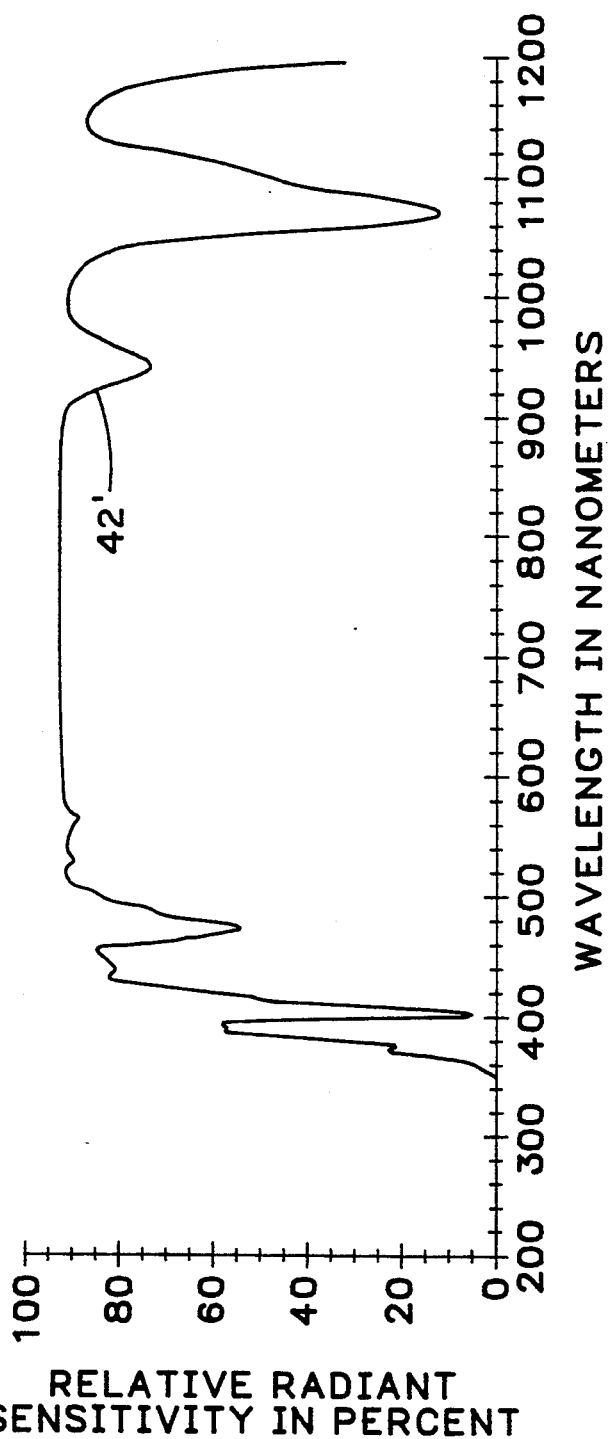
FIG. 5 is a graphical representation of the spectral response of the samarium doped optical glass filter used in the improved optical filter according to the present invention.

Referring to FIG. 5, there is shown a graphical representation of the spectral response curve 42' of a samarium doped glass filter having a thickness of 5 mm and manufactured by Schott Glass Technologies, Inc. of Duryea, PA. The samarium doped glass filter was developed for use as a laser pumping cavity filter for absorbing the 1060 nm wavelength and UV pumped light from neodymium lasing elements, such as Nd:YAG or Nd:glass rods. As stated by the manufacture, the filter reduces amplied spontaneous emissions and eliminates parasitic oscillations by absorbing the Nd laser light to increase laxing efficiency and power. The graph of FIG. 5 shows transmission through the glass is very low at the 1060 nm wavelength. The graph also shows a substantial transmission loss in the range of 470 nm. This coincides with the positive deviation in the amber or blue glass filter element 34 that is used in optical filters to simulate the spectral response of the average human eye as defined by the CIE response curve 40'.

Figure 6:
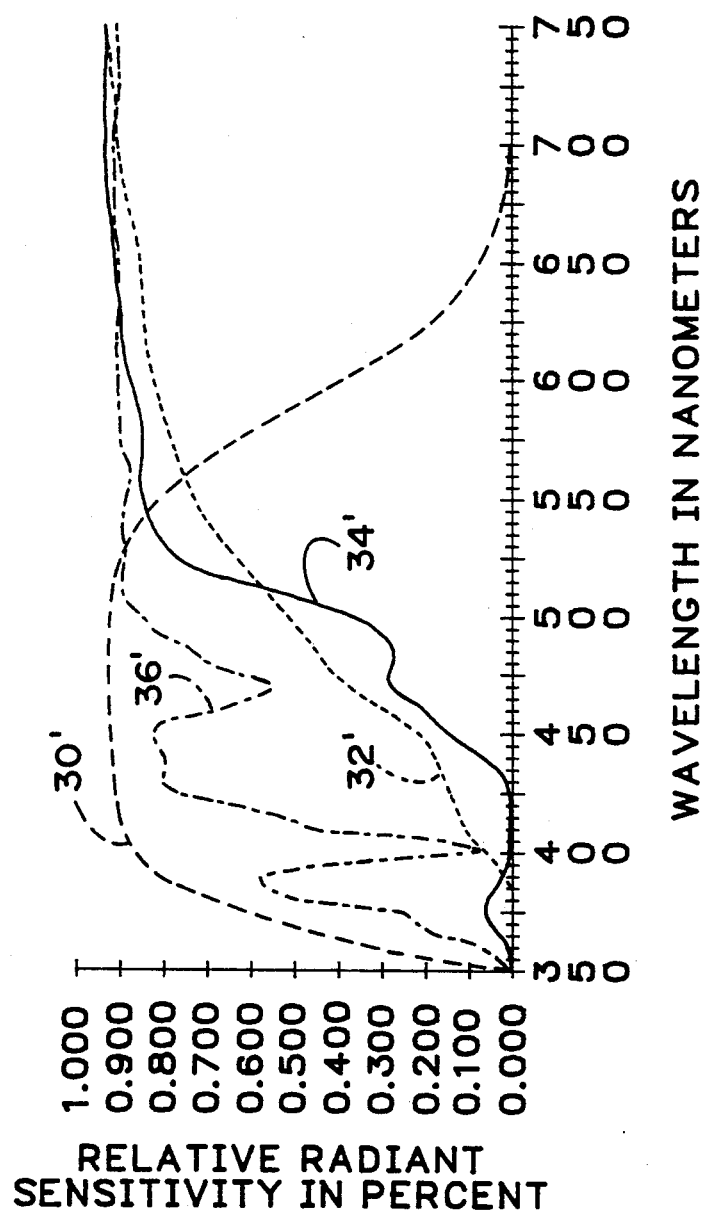
FIG. 6 is a graphical representation of the spectral response of the optical glass filter elements including the corrective glass filter element according to the present invention.
Figure 7:
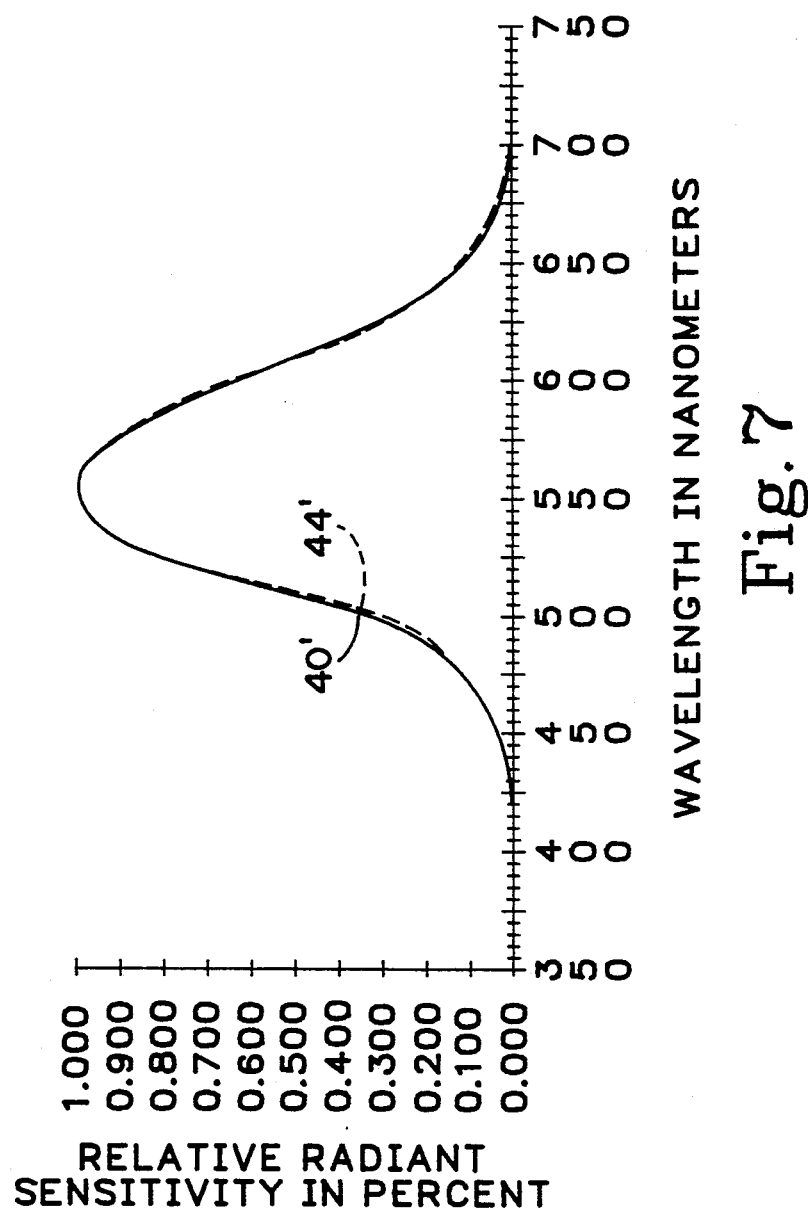
FIG. 7 is a graphical representation of the spectral response of the optical sensing unit having the photoelectric device and improved optical filter according to the present invention.

Referring to FIG. 6, there is shown a graphical representation of the same optical glass filter elements as shown in FIG. 3 with the addition of a corrective samarium doped glass filter 36 having the negative deviation in its spectral response curve 36' in the range of 470 nm. The thickness of the samarium glass filter element 36 is approximately 5.5 mm. Using the same mathematical procedure previously described for determining the total spectral response for the optical filter 14, the positive deviation characteristic of the amber or blue glass filter element 34 is offset by the corrective samarium doped glass filter 36. The result is an optical filter 14 that substantially matches the CIE response curve 40' for the average human eye as is shown graphically in the normalized spectral response curve 44' of the improved optical filter of FIG. 7.

The optical filter 14 of the present invention may also be constructed using an optical glass filter element or elements that conform somewhat to the CIE photopic curve onto which are affixed smaller pieces of glass to decrease the transmittance in specific spectral regions. The samarium doped glass filter is used in conjunction with the amber or blue glass filter to cancel out the positive deviation in the 470 nm range of these glass filter.

Radiance and irradiance are two other type of measurements made with the optical measurement instrument of the present invention. In making these measurements, a nearly equal spectral response over a range of wavelengths from ultraviolet to infrared is needed. Since the spectral response of the photoelectric device is not equal over the wavelength range, an optical filter is used that selectively absorbs the electromagnetic radiation to produce the needed response. Using an amber or a blue glass filter element in the radiance/irradiance optical filter produces the same positive deviation in the spectral response at 470 nm as was the case with the luminance/illuminance optical filter previously described. Adding a corrective samarium doped glass filter to the radiance/irradiance optical filter can offset the positive deviation caused by the amber or blue glass filter.

An improved optical filter has been described for use in an optical measurement instrument where a corrective optical glass filter having a negative deviation in the range of 470 nm is added to the optical filter to offset a positive deviation in an amber or blue glass filter in the same spectral region. The improved optical filter in interposed between a photoelectric element in the optical measurement instrument and the source of electromagnetic radiation. The photoelectric device covers the electromagnetic radiation to an electrical signal which is processed and displayed. In one embodiment of the invention the optical filter has a spectral response matching that of the average human eye and in a further embodiment the optical filter has an approximate equal response over a spectral range from ultraviolet to infrared. These and other aspects of the present invention are set forth in the appended claims.

I claim:

1. An optical filter for selectively absorbing electromagnetic radiation for matching the spectral response of the average human eye comprising:
    a plurality of optical glass filter elements with each element selectively absorbing a portion of the electromagnetic radiation with one of the optical glass filter elements exhibiting a positive deviation in the blue portion of the electromagnetic spectrum in the range of 470 nm; and
    a corrective optical glass filter element exhibiting a negative deviation in the blue portion of the electromagnetic spectrum in the range of 470 nm to offset the positive deviation in the optical glass filter.

2. The optical filter as recited in claim 1 wherein the corrective optical glass filter element is a samarium doped glass filter.

3. An optical measurement instrument for measuring electromagnetic radiation as a function of the spectral response of the average human eye comprising:
    a photoelectric device for receiving the electromagnetic radiation and having a spectral response greater than the average human eye;
    an optical filter interposed between the electromagnetic radiation and the photoelectric device having a spectral response matching that of the average human eye wherein the optical filter comprises:
    a plurality of optical glass filters elements with each element selectively absorbing a portion of the electromagnetic radiation with one of the optical glass filters elements exhibiting a positive deviation in the blue portion of the electromagnetic spectrum in the range of 470 nm; and
    a corrective optical glass filter element exhibiting a negative deviation in the blue portion of the electromagnetic spectrum in the range of 470 nm to offset the positive deviation in the optical glass filter; and
    means for producing an output representative of the spectral response of the average human eye.

4. The optical measurement instrument as recited in claim 3 wherein the corrective optical glass filter is a samarium doped glass filter.

* * * * *